United States Patent [19]
Guest

[11] Patent Number: 6,053,537
[45] Date of Patent: Apr. 25, 2000

[54] CONNECTORS FOR COUPLING TUBES

[75] Inventor: Timothy Stephen Guest, Bray, United Kingdom

[73] Assignee: John Guest Engineering Limited, Middlesex, United Kingdom

[21] Appl. No.: 09/022,239

[22] Filed: Feb. 11, 1998

[30] Foreign Application Priority Data

Feb. 13, 1997 [GB] United Kingdom .................... 9703004

[51] Int. Cl.⁷ ....................................................... F16L 21/00
[52] U.S. Cl. .................... 285/148.19; 285/179; 285/331; 285/351
[58] Field of Search .............................. 285/148.19, 179, 285/331, 351

[56] References Cited

U.S. PATENT DOCUMENTS

| | | |
|---|---|---|
| 3,532,131 | 10/1970 | Lefere . |
| 5,307,995 | 5/1994 | Jackson et al. . |
| 5,342,095 | 8/1994 | Klinger et al. ...................... 285/351 X |
| 5,423,577 | 6/1995 | Ketcham .............................. 285/351 X |
| 5,492,371 | 2/1996 | Szabo . |
| 5,507,536 | 4/1996 | Oliveto, II et al. . |
| 5,603,532 | 2/1997 | Guest . |
| 5,707,084 | 1/1998 | Szabo .................................. 285/351 X |

*Primary Examiner*—Anthony Knight
*Assistant Examiner*—Karlena D. Schwing
*Attorney, Agent, or Firm*—Baker & Daniels

[57] ABSTRACT

A connector for coupling a tube to an annular boss of a vessel wall, the annular boss having a wall with an inner surface. The connector includes a coupling body having first and second end portions with a throughway extending between the first and second end portions. The first end portion is adapted to receive and retain the tube. The second end portion includes an encircling seal and a grab ring to engage and retain the second end portion in the annular boss. The coupling body includes a sleeve encircling the second end portion, and an annular gap located between the sleeve and the second end portion for insertion of the wall of the annular boss into the annular gap to engage the seal and the grab ring, so that the sleeve supports the wall of the annular boss.

10 Claims, 1 Drawing Sheet

CONNECTORS FOR COUPLING TUBES

BACKGROUND OF THE INVENTION

1. Field of the Invention

This invention relates to connectors for coupling tubes and is particular although not exclusively applicable to connectors for coupling tubes to bosses on vessel walls.

2. Description of the Invention

In our European Patent Specification No. 0756125 we describe and illustrate a tube connector which is preferably formed in plastics and which has a coupling body formed with a socket containing a collet device for receiving and locking an end of a tube in the coupling body. The coupling body has a spigot at the other end of the body which could be provided with an encircling steel grab ring for engaging and holding the spigot in a thin-walled plastic sleeve or boss to which the coupling body is to be connected. One example of such an application is a vehicle fuel tank formed in plastics with an integral moulded boss on the tank to receive a connector for securing a tube to the tank. Such tanks which are supplied to the car manufacturer are invariably complex assemblies including fuel feed/return lines, vapour recovery and other "plumbing" fitments already attached ready for coupling to the various services of the vehicle. In current designs, such further components are hot-plated moulded to the tank but this has obvious restrictions, particularly where the tank is formed from high density polyethylene (HDPE) because it is only possible to weld high density polyethylene to high density polyethylene.

A further difficulty is that high density polyethylene tends to swell in contact with fuel as much as up to three percent and so any coupling to the tank must control or allow for this.

BRIEF DESCRIPTION OF THE INVENTION

This invention provides a connector for coupling a tube to an annular boss of a vessel wall, the connector comprising a coupling body having spaced end portions with a throughway extending between the end portions, a first end portion being adapted to receive and hold an end of a tube and a second end portion having encircling sealing means and detent means to engage and hold the end portion in the boss, the coupling body having a sleeve mounted thereon which encircles said second end portion with an annular gap between the sleeve and end portion in which the boss is engageable whereby the sleeve supports the wall of the boss in engagement with the sealing means and detent means of the second end portion.

The sleeve of the coupling body provides extra mechanical support to hold the boss on the tank in engagement with the seals and detent means of the end portion of the coupling body and to resist swell of the boss resulting from contact with the fuel contained in the tanks.

The sleeve, by providing extra mechanical support may also be attractive in other non-related applications where the port or boss on a tank is not mechanically strong enough by itself to carry the coupling.

BRIEF DESCRIPTION OF THE DRAWINGS

The following is a description of some specific embodiments of the invention, reference being made to the accompanying drawings in which.

DETAILED DESCRIPTION

Figure 1:
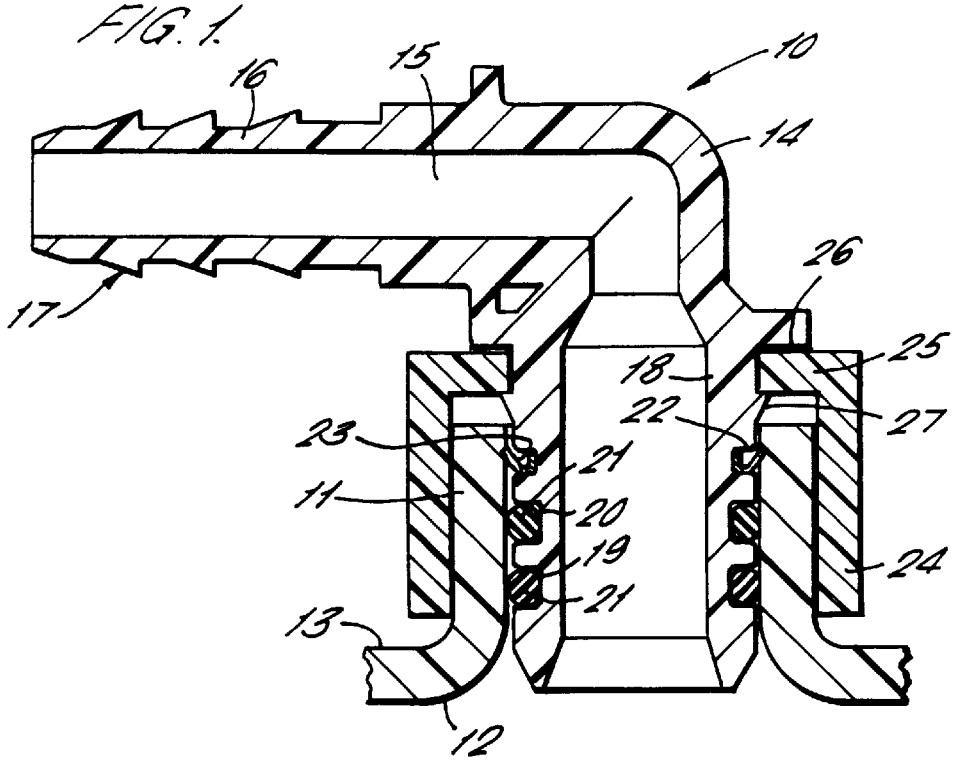
FIG. 1 is a diagrammatic sectional view through one form of connector to a tank.

Referring firstly to FIG. 1 of the drawings, there is shown a tube connector indicated generally at 10 mounted on an annular boss or up stand 11 formed at a port 12 in a moulded plastics vessel 13 such as vehicle fuel tank. The boss is of annular form.

The connector comprises a coupling body 14 in the form of an elbow with a central throughway 15 running through the elbow. The elbow has one limb 16 forming a stub pipe with a "fir tree" form outer profile indicated at 17 to receive an end portion of a length of plastic tubing (not shown) which is forced onto the stub pipe and is retained by the detent action of the "fir tree" formation on the stub pipe.

The other limb 18 of the elbow projects into the boss 11 on the fuel tank and is a close fit therein. Nearest the end of the limb there are two annular grooves 19,20 in the outer periphery of the limb at spaced locations along the limb in which O-ring or similar seals 21 are mounted to seal with the inner surface of the boss of the fuel tank. Spaced further from the end of the limb there is a further annular groove 22 encircling the outer periphery of the limb in which a star washer form grab ring 23 is mounted to engage the inner surface of the boss 11 and hold the limb in the boss.

The boss 11 on the fuel tank has a relatively thin wall and the nature of the plastics material is such that the wall of the boss has a degree of flexibility. In addition, the plastics material used for fuel tanks is such that contact with fuel can cause the plastics to expand. To reinforce the boss against flexing and expansion which could result in the release of the connector from the boss, an external metal hard plastics sleeve 24 is mounted on limb 18 of the connector at the end adjacent the apex of the connector to encircle with a close fit the outer side of the boss 11 and thereby hold the boss firmly in engagement with the limb and thereby with the grab ring 23 and seals 21. The sleeve 24 is retained on the limb of the connector by means of an annular flange 25 at the end of the sleeve remote from the open end of the limb 18. The limb 18 adjacent the apex of the connector has an annular shoulder 26 with which the flange 25 engages. To hold the flange 25 in position, there is a raised annular detent 27 on the limb spaced from the flange 26 by a distance slightly greater than the thickness of the flange 25 and which is dimensioned so that in locating the sleeve 24 on the limb 18 of the connector, the flange 25 has to be snapped over the detent 27 and is then retained by the detent 27 on the limb 18 loosely in engagement with the flange 26. It will be appreciated that many other arrangements may be provided for retaining the flange 25 on the limb.

Figure 2:
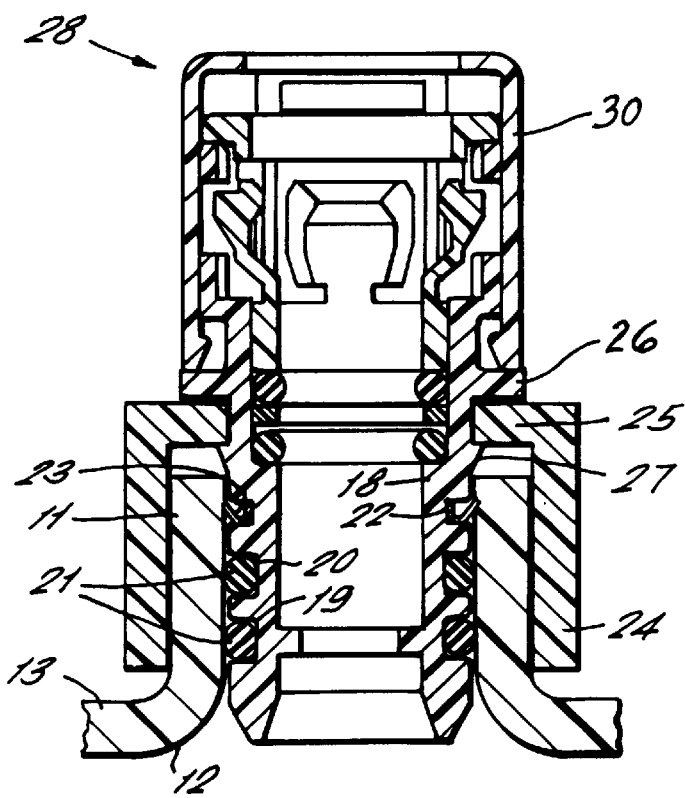
FIG. 2 is a diagrammatic sectional view through another form of connector to a tank.

FIG. 2 of the drawings shows an alternative construction in which like parts have been allotted the same reference numerals. In the arrangement of FIG. 2, the connector is a straight form connector and in place of male stub 16 of the arrangement of FIG. 1, there is a collet type connector 28 includes a push-in device 30 for receiving and securing an end of a tube in the connector 28 by simply pushing the tube into the connector 28. The connector is indicated generally at 28. A more detailed description of the connector is to be found in our European Patent Specification No. 0756125. The arrangement is otherwise similar to that of FIG. 1.

I claim:

1. A connector for coupling a tube to an annular boss, the annular boss having a wall with an inner surface, said connector comprising:

a coupling body having first and second end portions, a throughway extending between said end portions, said first end portion adapted to receive and hold a tube, said second end portion having an encircling seal and a grab ring to engage and retain said second end portion in an annular boss, a sleeve encircling said second end portion, an annular gap located between said sleeve and said second end portion for insertion of a wall of the annular boss thereinto and for engagement with said seal and said grab ring, whereby said sleeve supports the wall of the annular boss.

2. The connector of claim 1, wherein said sleeve is separate from said coupling body, said sleeve extending along said second end portion, said sleeve including mounting means remote from said second end portion for mounting said sleeve on said coupling body.

3. The connector of claim 2, wherein said mounting means comprises an annular flange.

4. The connector of claim 3, wherein said coupling body includes an annular shoulder and an annular detent, said annular detent spaced from said annular shoulder such that said annular flange may be snapped over said annular detent and trapped between said annular shoulder and said annular detent.

5. The connector of claim 1, wherein said seal comprises a first annular groove encircling said second end portion and an annular sealing ring located in said first annular groove, said annular ring engaging an inner surface of the wall of the annular boss.

6. The connector of claim 5, wherein said second end portion includes a second annular groove encircling said second end portion, said grab ring mounted in said second annular groove.

7. The connector of claim 6, wherein said first annular groove is located on said second end portion further from said first end portion than said second annular groove.

8. The connector of claim 1, wherein said first and second end portions extend at right angles to one another to define an elbow connector.

9. The connector of claim 8, wherein said first end portion has a plurality of external barbs for receiving and gripping the tube.

10. The connector of claim 1, wherein said first end portion includes a push-in device for receiving and securing the tube.

* * * * *